July 16, 1963 M. J. DIAMOND ETAL 3,097,523
SONIC TESTING DECAY DETECTOR
Filed July 26, 1960 2 Sheets-Sheet 1

INVENTORS
Milton J. Diamond,
BY Robert F. Spain, &
Robert H. Lutch
Robert E. Fowler
ATTORNEY

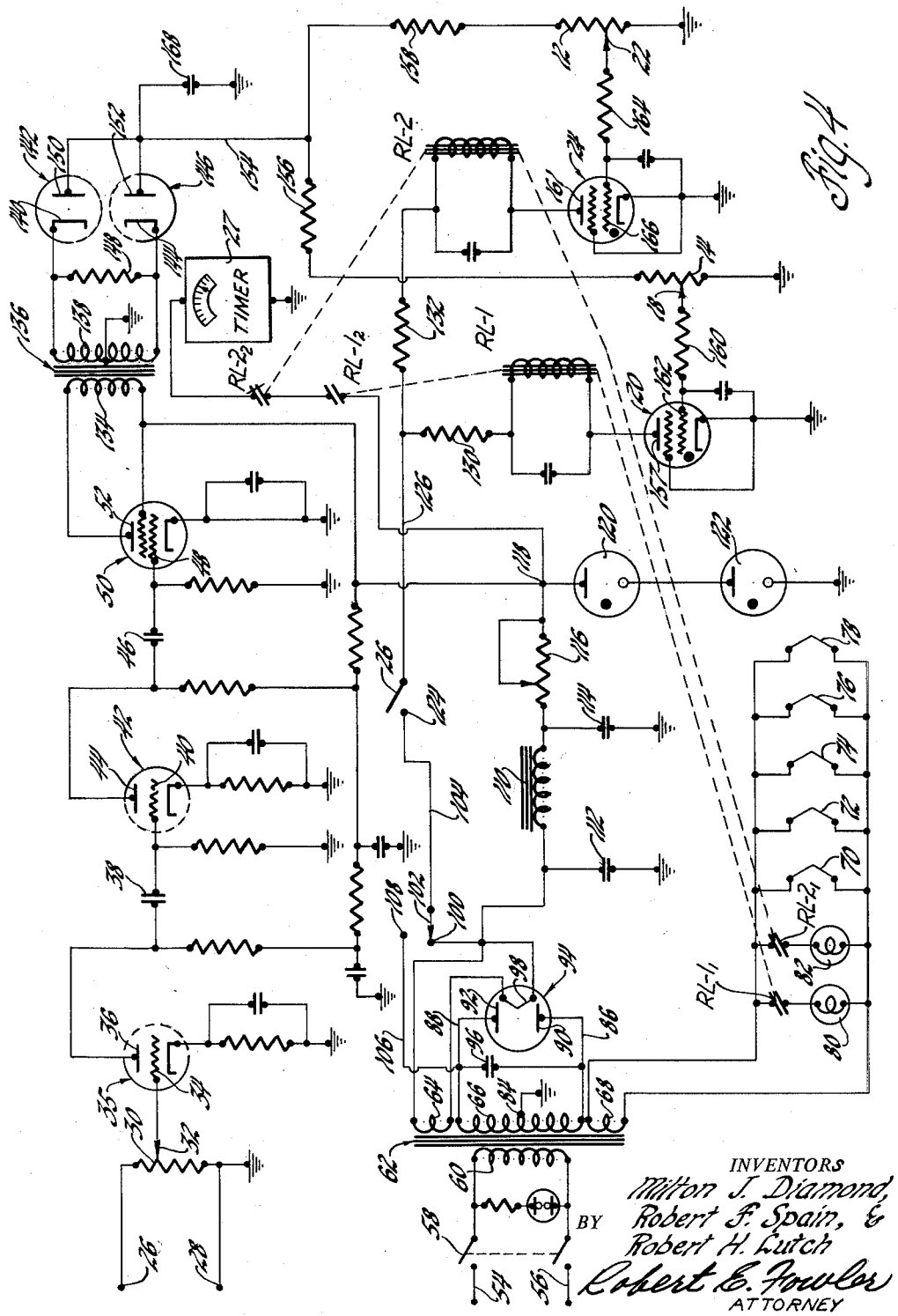

United States Patent Office 3,097,523
Patented July 16, 1963

3,097,523
SONIC TESTING DECAY DETECTOR
Milton J. Diamond, Saginaw, Robert F. Spain, Troy, and Robert H. Lutch, Birch Run, Mich., assignors to General Motors Corporation, Detroit, Mich., a corporation of Delaware
Filed July 26, 1960, Ser. No. 45,476
5 Claims. (Cl. 73—69)

This invention relates to means for testing individual parts intended for assembly to determine whether the parts are sound or contain flaws or occlusions.

Prior to the utilization of parts in production assembly operations it is necessary to test them to ascertain whether they have any occlusions, flaws or cracks which will make them unfit for use or which at some later time might cause failure of the machine into which they are assembled, necessitating expensive repairs. A part formed of metal and certain other substances even though of an irregular shape has a natural period of resonance when struck a blow and will resonate for a predetermined time period thereafter if sound. When a part has been designed and fabricated the natural frequency of vibration when supported at a given point can be determined and also the normal time of decay of resonant vibration in a sound part can be ascertained. Any flaw, occlusion or crack in the part will vary both the resonant frequency of an identical part when similarly supported or the decadence time of vibration or both. Either the resonant frequency when struck or the decadence time may be used to test the part for its soundness in comparison with identical parts.

A prior testing system shown and described in application Serial No. 616,267, filed June 16, 1956, now Patent No. 3,003,628, entitled "Sonic Inspection Apparatus," in the names of Milton J. Diamond, Phillip O. Frederickson and Robert F. Spain, assigned to a common assignee, discloses a testing system untilizing both the resonant frequency of the part and the time of decay of resonant vibration.

It has been discovered, however, that by utilizing only the time of decay of resonant vibration of the part to produce a classifying signal the testing system can be much simplified and still produce accurate results in selecting good castings from a series.

One of the difficulties encountered in operating a testing system such as that shown and described in Serial No. 616,267, Sonic Inspection Apparatus, is, that in order to obtain accurate results and properly segregate the good and bad castings, that each part should be struck with exactly the same force for test. This, of course, does not always occur which may lead to errors in classification.

It is, therefore, an object in making this invention to provide a system for testing identical parts for soundness by determining the decadence time of the resonant frequency of vibration of the part after it has been struck and using this as a classifying signal.

It is a further object in making this invention to provide testing means for sorting satisfactory from unsatisfactory parts utilizing a measurement of time of decay of resonance of a part for operating classifying apparatus.

With these and other objects in view which will become apparent as the specification proceeds, our invention will be best understood by reference to the following specification and claims and the illustrations in the accompanying drawings, in which:

FIG. 4 is a circuit diagram of the testing system of our invention.

As mentioned above, in sonic testing there are two characteristics which can be used for segregating the satisfactory from unsatisfactory castings. These are the frequency of resonant vibration of the casting and decrement time period of ringing of the casting after it has been struck. In the past systems have utilized either the resonant frequency or a combination of both characteristics. In the present form, however, only the decrement time is utilized by timing the period between two distinct levels of ringing signal amplitude which provides a control or indicating signal for operating classifying switches or relays.

Figure 1:
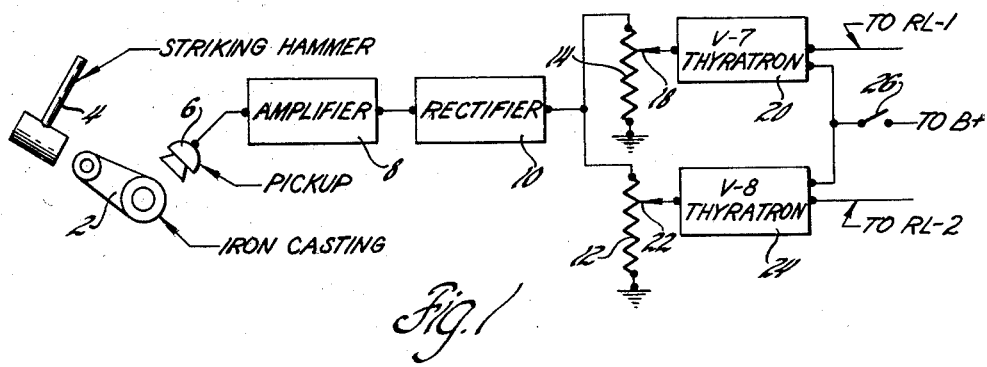
FIGURE 1 is a schematic diagram of a testing system embodying our invention.

The general system is disclosed in FIGURE 1 and there is shown therein a casting 2 which it is desired to test for soundness and which is supported in some satisfactory position. There is also provided adjacent the casting a striking hammer 4 for setting the casting into vibration and in spaced relation, a microphone pick-up 6 which is affected by the vibrations developed in the casting when struck. The output of the microphone or pick-up 6 is applied to an amplifier 8 and thence through a rectifier 10 to develop an output signal across a pair of resistances 12 and 14 in parallel to ground. The signal developed across the resistances 12 and 14 is a negative voltage signal and decreases in amplitude with time as the ringing decays. A variable tap 18 movable over the resistor 14 is connected to adjustably control a thyratron tube 20 which in turn determines the energization of a relay RL-1. In like manner a movable tap 22 is adjustably movable over the surface of resistance 12 and is connected to a similar thyratron tube 24 which controls the energization and deenergization of a second relay RL-2. The D.C. power supply indicated as B+ is connected to the two thyratrons to supply plate power thereto through a gate switch 26 whose operation will be explained.

In general the operation of the system is as follows:

(1) The casting 2 is set into vibration by being struck by the hammer 4.

(2) Resonant vibrations from the casting 2 are picked up by the microphone 6.

(3) The signal from the microphone 6 is applied to the amplifier 8 and amplified.

(4) The amplified output is next applied to the rectifier 10 to develop a negative direct current signal across the resistances 12 and 14 depending upon the amplitude of resonant vibration which negative voltage gradually decreases and which is applied to the thyratron grids.

(5) Direct current power is applied to the thyratron plate circuits to place the tubes in energizable condition through the gate switch 26. This switch is held open until the part has been struck and the input signal is of sufficient strength to hold the thyratrons in non-conducting or cut off condition as the signal decreases.

(6) As the signal negative voltage on the resistances 12 and 14 decreases due to decay of resonant amplitude, thyratron 20 is so adjusted as to fire first causing its relay RL-1 to be energized which will turn on a timer. As the signal voltage decreases further thyratron 24 will fire energizing its relay RL-2 which will turn off the timer.

(7) The decay time is read directly from the timer and will indicate the length of time the part resonated between two levels of intensity and thus the condition of the part. It must resonate at least a certain time to be a good casting. Shorter time indicates flaws.

Figure 2:
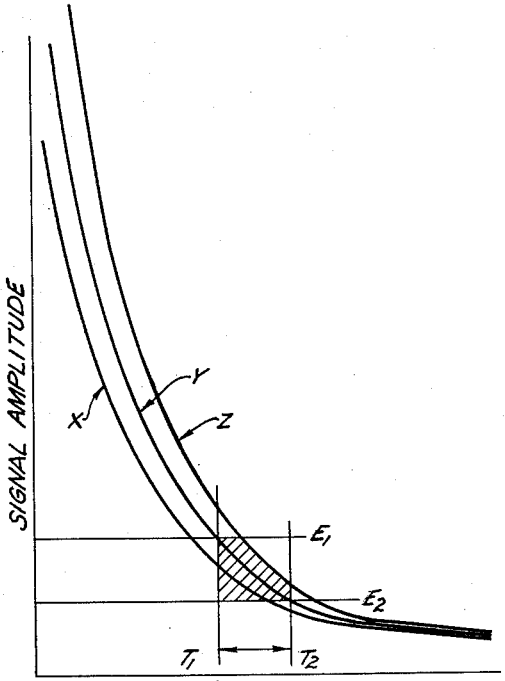
FIG. 2 is a graph illustrating the decay of signal amplitude with time in the prior type system such as shown in application Serial No. 616,267 above identified, when the parts are not struck equal blows.

As mentioned above with sonic inspection apparatus, if the part is struck a blow of different intensity a different strength signal will be obtained in a pick-up adjacent thereto. FIG. 2 illustrates the type of control signals obtained by such actions in a testing system as described in Serial No. 616,269 and shows clearly why a part struck a light blow may be rejected by that system even though it is good whereas a part struck a heavy blow might be placed in the acceptable group even though it has a small defect. In other words, it is more difficult to segregate with that type of system using decrement of ringing as a yardstick. Specifically in FIG. 2 signal amplitude is plotted against time and shows the variation between three curves $x$, $y$ and $z$. Curve $x$ represents the curve obtained when the casting is struck a lighter than normal blow. Curve $y$ is obtained by a normal blow, and curve $z$ is a harder than normal striking. In that particular system a first timer is used so that the apparatus will not respond to the initial shock wave but permit the part to settle down to a constant vibration before picking up a signal. Therefore, no signal was utilized until time $T_1$. Then unless the part continued to vibrate until time $T_2$ the part was not considered satisfactory. These two times are indicated on the normal curve $y$ but it is evident from the curves in FIG. 2 that the signal amplitude, obtained only provides a very short time signal between times $T_1$ and $T_2$. When the curves are displaced due to either a lighter or heavier than normal blow there is only a short time available between $E_1$, $E_2$, $T_1$ and $T_2$ and the utility of decay factor is almost lost. The selection, therefore, in the prior case is mainly dependent upon the frequency response of the casting.

Figure 3:
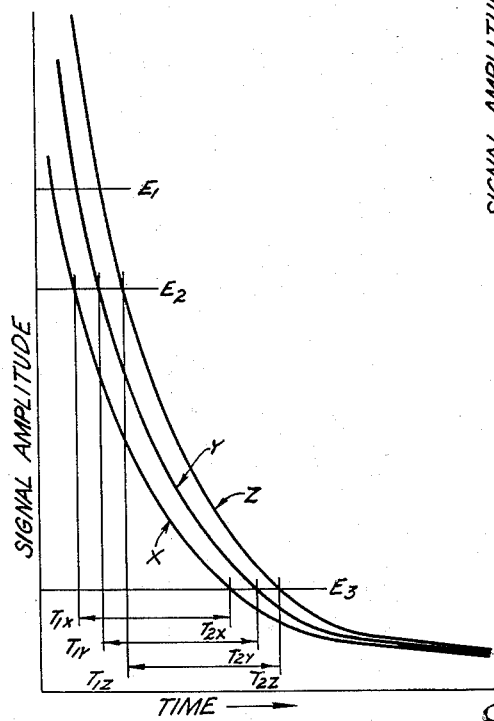
FIG. 3 is a similar graph illustrating the uniformity in operating signal time, regardless of variation in strength of blows, produced by the present system.

FIG. 3 shows a similar signal response by the current system. Signal amplification is again plotted against time for this test system and curves $x$, $y$ and $z$ also represent instances for lighter than normal striking, normal striking and heavier than normal striking, respectively, as in FIG. 2. In the general system shown in FIG. 1, however, and in the description it is to be noted that following the striking of the part, switch 26 stays open momentarily until the output on the two resistors 12 and 14 is sufficiently negative to hold the thyratrons off and is then closed by any suitable switch operating means. There is an instant, therefore, after the striking of the part, that may be as short as .01 second before switch 26 closes. First switch 26 closes at voltage $E_1$, which is that voltage present when switch 26 is permitted to close, and this will be described more in detail later. As the signal decays and the negative voltages on resistances 14 and 12 decrease a point is reached at $E_2$ where tap 18 has been set to permit thyratron 20 to fire and energize relay RL–1. This is at point $T1_x$. Then as the signal decreases farther on the $x$ curve, a point is reached determined by the setting of tap 22 where thyratron 24 will fire. This is at voltage $E_3$. Relay RL–2 will now be energized. This is at time $T2_x$. The distance between $T1_x$ and $T2_x$ is a measure of the decadence or decrement time and determines whether the part is satisfactory or not.

If, however, instead of being struck only a light blow the casting was hit a normal or average blow as shown by curve $y$, then the input signal would in like manner first decrease to a voltage $E_1$ at which point switch 26 would again close, gradually decrease further to voltage $E_2$ where thyratron 20 would fire to energize RL–1, and lastly to the voltage $E_3$ where the second thyratron 24 would fire and relay RL–2 would be energized. On the time base on curve $y$ we now find that the time at which curve $y$ reaches voltage $E_2$ is time $T1_y$ and when it reaches $E_3$ it is $T2_y$. However, it is to be noted that the distance between $T1_y$ and $T2_y$ or the total elapsed time remains substantially the same as that when the casting was only struck a light blow or that time interval $T1_x$ to $T2_x$. Expanding still further and assuming that the casting has now been struck an extra heavy blow, curve $z$ is the resultant plot of the voltage-time curve of that condition and again we have the same factors. Plotting this curve results in an indicated distance between $T1_z$ and $T2_z$ which still remain substantially the same elapsed time as that time between $T1_x$ and $T2_x$. Thus by utilizing the present system regardless of the strength of the blow the decadence time as measured is substantially the same for all identical parts if the part is good and this testing system does not give an erroneous result due to changes in strength of blows.

Referring now more particularly to FIG. 4 which discloses a circuit diagram of the whole system, there is shown therein a pair of terminals 26 and 28 which are connected to the output of the microphone 6 or pick-up and across which the input signal is developed. This signal is applied to a resistance 30 and a variable tap 32 movable thereover is connected directly to the control grid 34 of tube 35 of the first stage of a three-stage amplifier to apply the signal thereto. The plate 36 of this tube is connected directly through a coupling condenser 38 to the grid 40 of a second amplifying stage tube 42 and similarly the plate 44 of that tube is connected through a coupling condenser 46 to the control grid 48 of a third stage amplifying tube 50. The signal, therefore, picked up from the microphone and applied to the input terminals 26, 28 is amplified through these three stages and appears at the output plate 52 of the last stage.

The power supply for the amplifier is provided by conventional 110 volt lines which may be any outlet indicated at 54, 56 and then through a double pole switch 58 to transformer primary 60 of transformer 62. The transformer 62 provides power for the whole system and it is provided with three secondary windings 64, 66 and 68. Secondary winding 68 is a low voltage winding and this provides six volts to the filament circuits of the tubes as shown at 70, 72, 74, 76 and 78 and also to two indicating lights 80 and 82 which are connected in two separate series circuits with contacts RL–1$_1$ and RL–2$_1$, respectively, across the secondary. These contacts are operated by their respectively indicated relays and are closed when the relays are energized to indicate that condition. The main secondary winding 66 has its center tap grounded as shown at 84 and the two outside terminals are connected through lines 86 and 88 with the anodes 90 and 92 of a full wave rectifying tube 94. A condenser 96 is connected directly across the secondary winding 66 to smooth out the oscillations. The cathode 98 of the rectifying tube 94 is connected directly across the third secondary winding 64 of the transformer 62. The output of the rectifier is connected to stationary terminal 100 which is engageable by movable switch arm 102 to provide D.C. current to the power line 104 for the relays. If it is desired, to use A.C. current for relay operation a separate line 106 is provided coming directly from one terminal of the secondary winding 66 ahead of the rectifier which line terminates at stationary contact 108. If switch arm 102 is moved to engage contact 108 then alternating current power is supplied to line 104.

The rectifier output is fed through a filter circuit consisting of choke 110 and a pair of filtering condensers 112 and 114 and thence to a rheostat 116 to provide the desired direct current voltage on line 118. A pair of regulating tubes 120 and 122 are connected in series between line 118 and ground to regulate the power line 118. This line supplies the direct current power to the amplifier and specifically to all of the plate circuits thereof. The power line 104 which can either be supplied with direct or alternating current is provided to energize the two control relays RL–1 and RL–2. Line 104 is, therefore, connected to stationary terminal 124 of gate switch 26 and thence through line 126 to one terminal of limiting resistor 130 and also to one terminal of resistor 132. The opposite terminal of resistor 130 is connected to one side of relay coil RL–1 and the remaining terminal of resistance 132 is in like manner connected to one terminal of relay coil RL–2. The two thyratron tubes 20 and 24 have their plates 157 and 161, respectively, connected directly to the remaining terminal of the relay coils RL-1 and RL-2 and it is the flow through these two tubes the cathodes of which are grounded which determines the energization of either relay and the actuation of switches controlled thereby.

As also indicated in FIG. 1 the output of the three-stage amplifier 8 is fed into a rectifier and this is specifically shown in FIG. 4 since the plate 52 of the last stage of the amplifier is directly connected to a primary winding 134 of transformer 136. Secondary winding 138 of this transformer has its center tap grounded and one terminal connected to the cathode 140 of one diode 142 and the opposite terminal connected to a similar cathode 144 of diode 146. Resistor 148 is connected across the secondary winding 138. The two anodes 150 and 152 of the two tubes 142 and 146 forming a full wave rectifier are connected together and to line 154 which extends to a common terminal of a voltage divider including resistances 156 and 158. The remaining terminal of resistance 156 is connected through resistance 14 to ground and the remaining terminal of resistance 158 in like manner through resistance 12 to ground. The adjustable tap 18 movable over resistance 14 is shown connected through a limiting resistance 160 to the control grid 162 of thyratron tube 20 and its position will determine the voltage at which the tube will fire. The movable tap 22 movable over resistor 12 is connected through limiting resistor 164 to control grid 166 of thyratron tube 24 and its position likewise determines the firing point of tube 24. Condenser 168 is connected between line 154 and ground to shunt off any high frequency current.

As illustrative but in no sense in a limiting sense the control relays are here shown as actuating control switches RL-1₂ and RL-2₂ for controlling a timer. Contacts RL-1₂ are normally open contacts and are closed when relay coil RL-1 is energized. On the other hand, contacts RL-2₂ are normally closed contacts and are opened when relay coil RL-2₂ is energized. These two sets of contacts are connected in a series circuit with a timer 27 between power line 118 and ground. When relay coil RL-1 is energized the circuit will be complete to the timer and it will start to run. When relay coil RL-2 is energized to open its contacts the circuit will open and the timer will be deenergized so the reading on the timer will be T1—T2 as shown in FIG. 3 and indicate the soundness of the part.

In the operation of this system when the casting is struck, a signal from the microphone pick-up is applied to the input of the three stage amplifier, amplified, then applied to the rectifier section to develop a high negative voltage across resistances 12 and 14. At a short time after initial striking the gate switch 26 is automatically closed but the relay coils RL-1 and RL-2 will not be energized since both thyratron tubes are highly biased off. As the amplitude of the resonance signal of the part decays, the amount of negative voltage on these two resistors decreases. They are so adjusted that at a first voltage thyratron tube 20 will conduct and fire. At this point relay RL-1 will be energized and close a switch which turns on a timer (not shown) which can be any one of a large variety of commercial timers. As the output signal continues to decrease the negative bias on thyratron tube 24 decreases and reaches a point where it will fire and it will do so causing energization of relay coil RL-2 which opens a switch to the timer turning it off. The timer, therefore, provides direct indication of the time required for the resonance signal of the part to decay from one amplitude level to another and is determinative of the soundness of the part. Intsead of a timer the relay coils can control other selective apparatus for segregating parts such for example as gates to bins for satisfactory or unsatisfactory parts which are positioned by the relay switching means can be substituted for the timing means 27 are within the purview of our invention.

What is claimed is:

1. In testing means for checking the soundness of parts having a natural resonant frequency of vibration, means to strike a part to be tested to set it into resonant vibration, transducer means mounted adjacent said part when in its vibratory state to pick up the mechanical vibrations of the same and convert them into electrical oscillations, amplifying means connected to the transducer means to amplify the electrical oscillations produced by the transducer means, rectifier means connected to the amplifying means to provide a direct current voltage from the signal output of the amplifying means, a plurality of parallel circuits connected to the output of the rectifier means each including adjustable impedance means across which the direct current voltage is developed, a source of electrical power, electronic means having a control electrode connected to each adjustable impedance means and set to conduct at different values, a first switching means connected between the source of electrical power and the electronic means to control the initial energization thereof, relay switching means connected to each electronic means and actuated by conduction through the same and timing means connected to the source of electrical power and the relay switching means and turned on and off thereby to indicate the duration of the time of decay of the amplitude of the signal from one value to another as indication of the soundness of the part.

2. In testing means for checking the soundness of parts having a natural resonant frequency of vibration, means to strike a part to set it into vibration, means mounted in proximity to said part sensitive to the mechanical vibrating waves thereof to pick up said waves, convert them into electrical oscillations and produce direct current voltages proportional to the amplitude of the resonant vibration, a plurality of adjustable impedance means connected to the first-named means and across which biasing voltages are developed by the proportional direct current voltages, a source of electrical power, electronic control means connected to each adjustable impedance means the conductance of each electronic control means being determined by the adjustment on its associated impedance means, a first switching means connected between the source of electrical power and the electronic control means to control initial energization thereof, a plurality of second switching means connected together and to each electronic control means and operated by the conduction therethrough, time period indicating means connected to said second switching means and controlled thereby providing an indication of the decay time of signal amplitude from one value to another after setting a part into resonant vibration as a measure of soundness of the part.

3. In testing means for checking the soundness of parts having a natural resonant frequency of vibration, means to strike a part to set it into vibration, means mounted in proximity to said part sensitive to the mechanical vibrating waves thereof to pick up said waves, convert them into electrical oscillations and produce direct current voltages proportional to the amplitude of the resonant vibrations, a plurality of adjustable impedance means connected to the first-named means and across which biasing voltages are developed by the proportional direct current voltages, a source of electrical power, electronic control means connected to each adjustable impedance means the conductance of each electronic control means being determined by the adjustment of its associated impedance means, a first switching means connected between the source of electrical power and the electronic control means to control initial energization thereof, a plurality of second switching means connected together and independently to each electronic control means and separately operated by the conduction therethrough, and timing means connected to the second switching means and controlled thereby to indicate the length of time between the actuation of different portions of the second switching means and thus the time of decay of signal amplitude from one value to another as a measure of the soundness of the part.

4. In testing means for checking the soundness of parts having a natural resonant frequency of vibration, means for supporting a part so that it may freely vibrate at a resonant frequency, means for striking said part while so supported to set it into resonant vibration, a microphone mounted in proximity to the part to pick up the resonant vibrations and convert them into electrical oscillations, rectifying means connected to the microphone to convert the electrical oscillation to direct current, a plurality of variable resistance means connected in parallel to the rectifying means and across each of which a voltage is developed which is proportional to the amplitude of vibration of the part at a given instant, a source of electrical power, a plurality of electronic means each having a control electrode, means connecting the control electrode of one electronic means to one variable resistance means and the control electrode of the other electronic means to the other variable resistance means, said variable resistance means being differently adjusted to apply different proportional voltages to the electronic means so that one will conduct before the other as the total applied amplitude changes, a first switching means connected between the source of electrical power and the electronic means to control initial energization thereof, second switching means connected to each electronic means and actuated by the conduction thereof and indicating means connected to the second switching means to indicate the time of decay of vibrating amplitude from one intensity to another as a measure of soundness of a part.

5. In testing means for checking the soundness of parts having a natural resonant frequency of vibration, means for supporting a part so that it may freely vibrate at a resonant frequency, means for striking said part while so supported to set it into resonant vibration, a microphone mounted in proximity to the part to pick up the resonant vibrations and convert them into electrical oscillations, rectifying means connected to the microphone to convert the electrical oscillations to direct current, a plurality of variable resistance means connected in parallel to the rectifying means and across each of which a voltage is developed which is proportional to the amplitude of vibration of the part at a given instant, a plurality of electronic means each having a control electrode, means connecting the control electrode of one electronic means to one variable resistance means and the control electrode of the other electronic means to the other variable resistance means, said variable resistance means being differently adjusted to apply different proportional voltages to the respective electronic means so that one will conduct before the other as the total applied amplitude changes, a source of electrical power, first switching means between the source of electrical power and said electronic means, second switching means connected to each electronic means and actuated by conduction thereof, indicating means connected to said second switching means to indicate when the amplitude of vibration is at different predetermined levels as a measure of soundness of the part, said first-named switching means controlling the general energization of the electronic means.

References Cited in the file of this patent
UNITED STATES PATENTS 2,571,409     Beyers et al. _____ Oct. 16, 1951